July 21, 1931.  L. KAMBO  1,815,475
VARIABLE SPEED GEAR
Filed Nov. 30, 1929  3 Sheets-Sheet 2
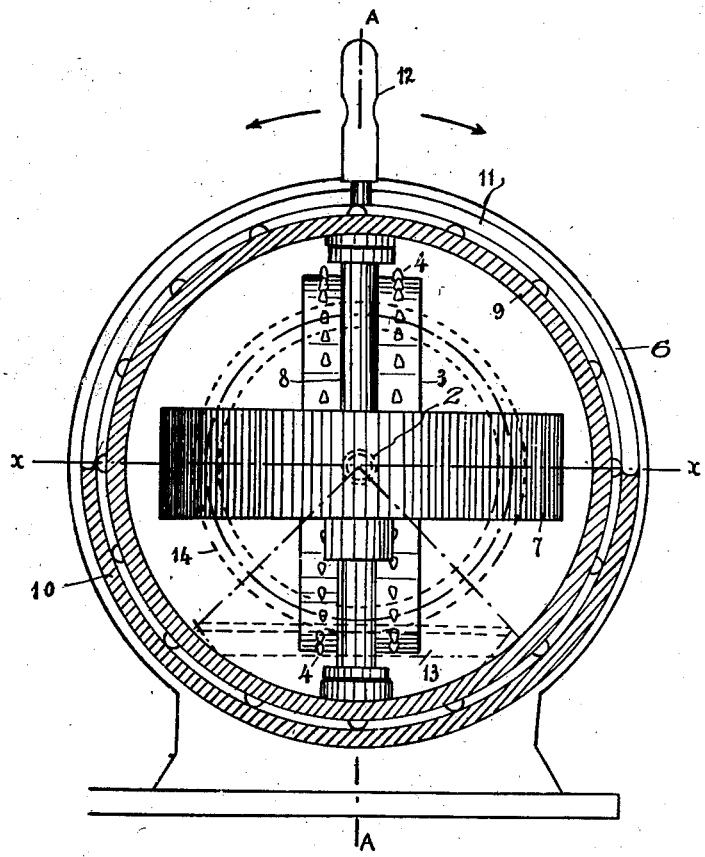
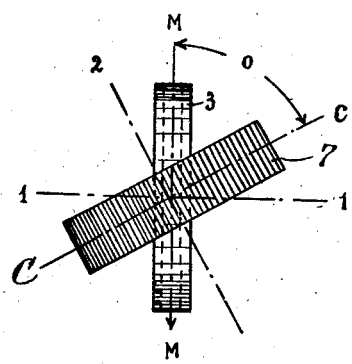
INVENTOR
Luigi Kambo
by
Attorney July 21, 1931.  L. KAMBO  1,815,475
VARIABLE SPEED GEAR
Filed Nov. 30, 1929  3 Sheets-Sheet 3

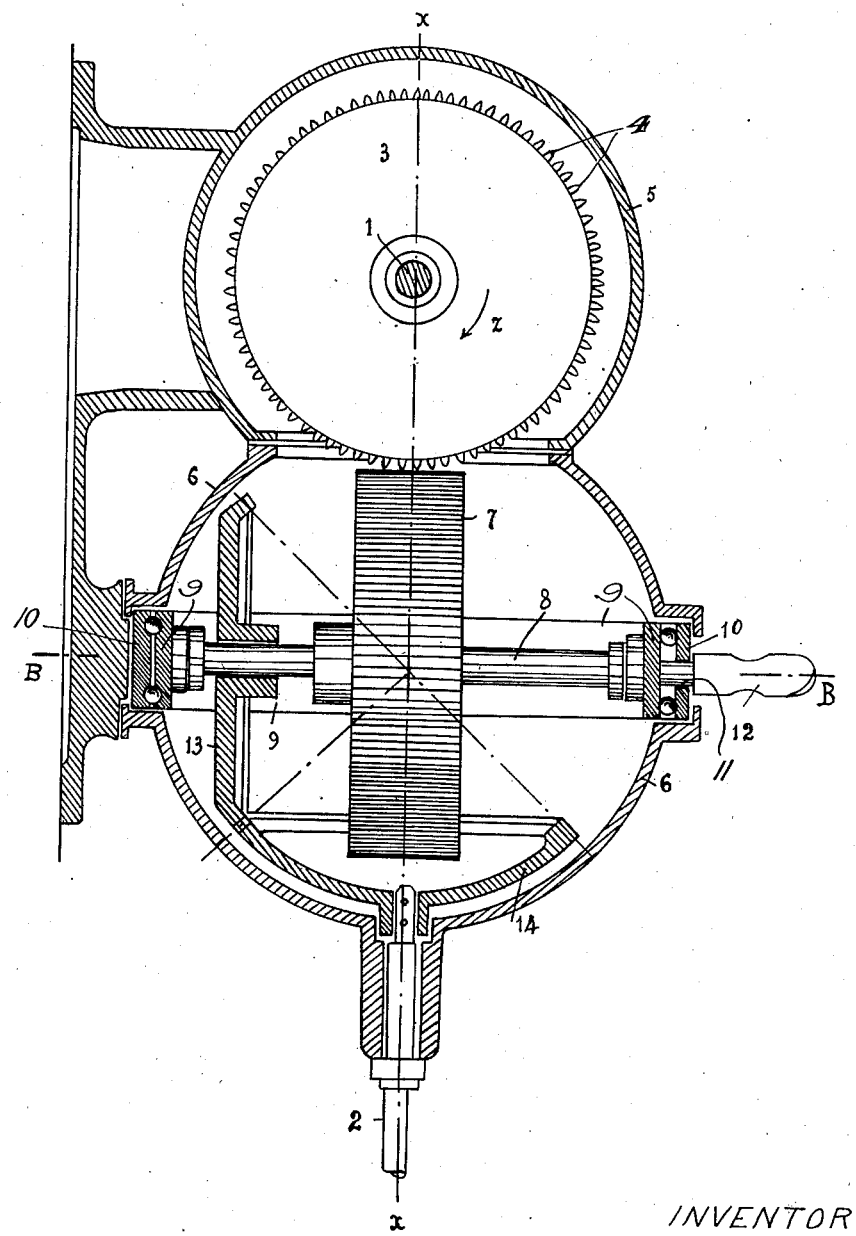

LUIGI KAMBO
INVENTOR
BY
HIS ATTORNEY

Patented July 21, 1931

1,815,475

UNITED STATES PATENT OFFICE

LUIGI KAMBO, OF ROME, ITALY

VARIABLE SPEED GEAR

Application filed November 30, 1929, Serial No. 410,717, and in Italy December 3, 1928.

In a previous Patent, No. 1,711,791, of May 7, 1929, issued to applicant a course recording apparatus has been described for tracing automatically, to a given scale, the course followed by any vehicle traveling on land, at sea or in the air.

The said course-recording apparatus did comprise, amongst other devices a speed reducing gear having a gradually variable ratio of transmission, in which the variability of the ratio of transmission was obtained by varying the angle formed by the axles of a sprocket wheel and of a globular ribbed wheel, interposed on the transmission, and meshing together.

The present application has for its object certain improvements in the above said device for changing gradually the speed, which also greatly simplify the construction of the same.

And since said device can be evidently applied with advantage to many other apparatus and contrivances in which it may be desirable to have a gradually variable speed gear, capable at the same time of producing a reversal of the movement, the improved device will hereinafter be described separately from the parts of the course-recording apparatus which, on the other hand, as it will be seen, do not undergo any material change owing to the improvements in the variable speed gear.

In the accompanying drawings, which serve to illustrate by way of example a practical embodiment of the improved variable speed gear according to the present invention:

Fig. 1 shows a longitudinal section of the gear and

Fig. 2 shows a cross section of it, the section of Fig. 1 being made according to line A—A of Fig. 2, and the section of Fig. 2 according to line B—B of Fig. 1.

Fig. 3 is a diagram which serves to explain the principle on which the variability of the transmission ratio is obtained.

Figure 4:
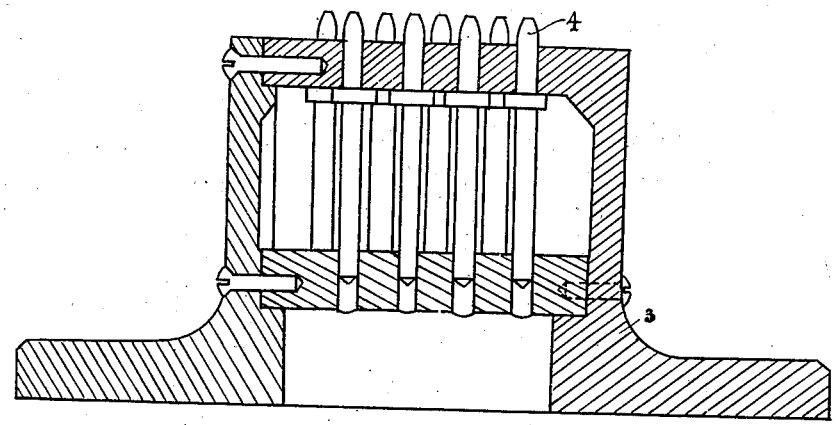
Fig. 4 is a cross section through the rim of the driving wheel made at a larger scale.

In the example shown it is assumed that the movement is transmitted by a driving shaft 1 to a driven shaft 2, the two shafts being placed at right angles with respect to each other.

On the driving shaft 1 which revolves in the direction indicated by the arrow —z—, is keyed the driving wheel —3— fitted with one or more rows of retractile pins 4. In the drawings only two of these rows are shown, although there are actually three, the third or central row being covered by the shaft 8 in Fig. 2.

In order to obtain smoothness of movement it is advisable that these pins be fitted so as to allow them to be pressed inwards and this can be obtained by means of a small spring 15 (Fig. 5) wound around or placed under each of them in convenient recesses provided thereto.

The driving wheel 3 is preferably enclosed in a casing 5 having the shape of a cylindrical drum and which carries also the bearings (not shown in the drawings) for the shaft 1.

Another casing 6 of spherical or spheroidal shape placed near the casing 5, contains in its inside the driven wheel 7 which is keyed on the shaft 8 revolving in bearings carried by a ring 9 the centre of which coincides with the point of intersection of the middle plane of the wheel 7 with the axis of the shaft 8. The ring 9 is in its turn mounted so that it can revolve inside a ring 10 fastened to the casing 6 and provided with a slot 11 through which passes a controlling lever or handle 12 by means of which the wheel 7 can be rotated around a diameter of its middle plane, indicated with x—x in the drawings.

Consequently, by rotating the handle 12 either by hand or with the means mentioned in the above said patents, the angle O between the middle planes MM and CC, Fig. 3, of the driving and driven wheels, can be made to assume any desired value comprised between 0° and 90°.

Figure 5:
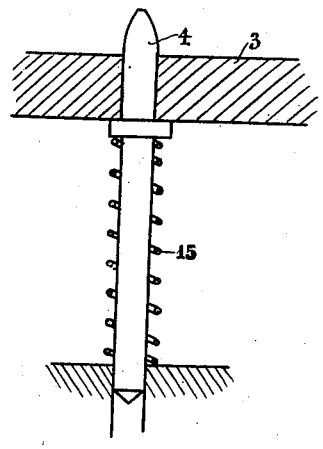
Fig. 5 shows in detail one of the pins constituting the retractile teeth of the driving wheel.
Figure 6:
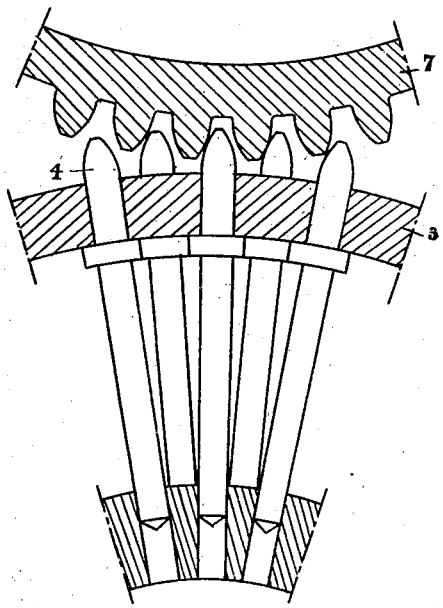
Fig. 6 shows the engagement between the driving wheel and the driven wheel.

The wheel 7 has a grooved, or ribbed surface, with grooves or ribs parallel to the direction of its axis, and into these grooves engage the retractile pins 4 of the driving wheel 3. (See Fig. 6.) The retractile pins 4 are arranged in one or more rows on the rim of the wheel 3. Fig. 4 shows in transversal section two sets, each consisting of four rows of pins 4. Fig. 5 shows the manner in which each pin is maintained in working position by a spring 15. When, as shown on Figs. 1 and 2 of the drawings, the two wheels 3, 7 have their axes at right angles, the wheel 3 revolves without transmitting any movement to the wheel 7. By diminishing the angle between the two axes in either direction, the wheel 7 starts revolving, and revolves at a speed which is inversely proportional to said angle, so that, when the two axes have become parallel, thus reducing to 0° the angle comprised between them, the peripherical speeds of the wheels are equal.

As however the shaft of the grooved wheel 7 becomes shifted, upon the transmission ratio being changed in the manner above described, it is connected to the shaft 2, which is fixed against axial movement, by the following arrangement.

On the shaft 8 is keyed a conical wheel 13 which engages another conical wheel 14 keyed on the shaft 2, and as the axes of the two shafts 8, 2 pass through the centre of the ring 9, so when this ring revolves, the wheel 13 rolls around the wheel 14 as a planetary gear, maintaining its engagement therewith, so that the transmission occurs always in the same way whatever may be the angle O comprised between the two planes MM, CC.

It will be apparent that with a reduction of speed obtained in this manner it is possible to overcome resisting torques applied to the driven shaft having practically any value whatever while maintaining constant the power applied to the driving shaft and the speed of rotation of it.

Having thus described my invention, I claim as new and desire to secure by Letters Patent:

1. In a variable speed gear of the type in which the variation of the ratio of transmission and the reversal of the movement are obtained by varying the angle between the planes of the driving wheel and of an intermediary cross wheel, the combination of a driving shaft carrying a driving wheel provided with retractile teeth, a driven shaft and an intermediary cross shaft on which a ribbed wheel is mounted which engages with the said driving wheel at various inclinations, a ring carrying the bearings of said cross shaft, which ring is mounted on its turn in such a way that it can revolve on itself and two conical wheels engaging in any position of the revolving ring, one of these wheels being keyed on the shaft of the ribbed cross wheel movable together with the ring, the other being keyed on the driven shaft, which is fixed against axial movement.

2. A variable speed gear according to claim 1, in which the pins of the driving wheel are fitted elastically retractile thereon and are arranged in several rows.

3. Variable speed gear according to claim 1, in which the revolving ring carrying the ribbed cross wheel is provided with suitable controlling means allowing to shift the ring as it may be required.

In testimony whereof I have affixed my signature this 18th day of November, 1929.

LUIGI KAMBO.